Patented Aug. 5, 1924.

1,503,984

UNITED STATES PATENT OFFICE.

LEE H. CONE, OF MOUNTAIN LAKES, NEW JERSEY, ASSIGNOR TO NATIONAL ANILINE & CHEMICAL COMPANY, INC., OF NEW YORK, N. Y., A CORPORATION OF NEW YORK.

MANUFACTURE OF 2.3-HYDROXYNAPHTHOIC ACID.

No Drawing.   Application filed February 15, 1922. Serial No. 536,804.

*To all whom it may concern:*

Be it known that I, LEE H. CONE, a citizen of the United States, residing at Mountain Lakes, in the county of Morris, State of New Jersey, have invented certain new and useful Improvements in the Manufacture of 2.3-Hydroxynaphthoic Acid; and I do hereby declare the following to be a full, clear, and exact description of the invention, such as will enable others skilled in the art to which it appertains to make and use the same.

This invention relates to improvements in the manufacture of sodium beta-naphtholate and in the manufacture of 2.3-hydroxynaphthoic acid therefrom.

In the manufacture of 2.3-hydroxynaphthoic acid from sodium naphtholate it is essential that the sodium naphtholate be dry and in a condition to absorb carbon dioxide. Sodium naphtholate can readily be prepared on a laboratory scale in the form of a fine dry powder by evaporation of the aqueous solutions of the naphtholate under reduced pressure and with agitation; but this method of preparation presents considerable difficulty when carried out on a plant scale, owing to the tendency of the material to form into lumps or balls from which the water is driven off with difficulty, while the resulting naphtholate, when subjected to a conversion temperature in the presence of carbon dioxide, tends to overheat in spots with consequent decomposition of the acid produced therefrom.

According to the present invention these difficulties are overcome or minimized, and the sodium beta naphtholate is produced in a finely divided dry state and in a form well adapted for use in the manufacture of 2.3-hydroxynaphthoic acid therefrom.

The present invention is based upon the discovery that the water can readily be driven off from a solution of sodium beta-naphtholate and the naphtholate obtained in a dry and finely divided condition by heating a solution of the naphtholate in contact with an indifferent solvent or diluent, such as melted paraffin, the dry sodium naphtholate being thus obtained in a finely divided condition in admixture with the molten paraffin. The invention is based upon the further discovery that the finely divided naphtholate so produced, and still in admixture with and suspension in the molten paraffin can be readily converted into 2.3-hydroxynaphthoic acid by the action of carbon dioxide under pressure and at an elevated temperature. The invention, accordingly, includes improvements both in the manufacture of the sodium beta-naphtholate, and in the manufacture of the 2.3-hydroxynaphthoic acid therefrom.

The indifferent solvent or diluent utilized in the process should be one which is not substantially volatile at the temperatures employed, and particularly at the temperatures employed in the treatment of the dry naphtholate with carbon dioxide. That is, the inert diluent should not distill at a temperature below about 250° C. Ordinary paraffin wax, for example, that known to the trade as "crude white scale" and melting at 124–126° F. is well adapted for use. The melting point, preferably below that of the boiling point of water, does not appear to be of importance, and the material may be liquid at ordinary temperatures, as in the case of high boiling paraffin oils, boiling above 250° C. The present invention, accordingly, includes the drying of the sodium beta-naphtholate and its subsequent carbonation and conversion in the presence of a liquid medium having a boiling point above the conversion temperature and which will not combine or react with the sodium beta-naphtholate or with the hydroxynaphthoic acid formed therefrom.

The invention will be further illustrated by the following specific examples, but it will be understood that the invention is not limited thereto:

Molecular portions of beta-naphthol and caustic soda are dissolved in just sufficient water to give a clear solution, and the solution is placed in an autoclave with a quantity of paraffin wax, for example, equal in weight to that of the beta-naphthol, although this amount may be varied somewhat with the type and size of the autoclave. The mixture is heated in the autoclave under reduced pressure and, when the water is nearly all driven off, the temperature is gradually raised to about 200° C. and held there for a sufficient time to complete the dehydration. This results in the production of a finely divided dry naphtholate suspended in the molten paraffin, while by cooling with agitation, a solid mass of paraffin is obtained with the naphtholate uniformly distributed through it. The naphtholate is thus protected by the paraffin and can be preserved in this way for shipment or until it is to be used.

When the dry naphtholate is to be used directly for the production of the 2.3-hydroxynaphthoic acid it is not necessary to separate the naphtholate from the paraffin, but the resulting mixture can be directly used. In practice the hot mixture of melted paraffin and naphtholate is allowed to cool, for example, only to about 125 to 130° C., and is then subjected to agitation and to the action of carbon dioxide under pressure, and, finally, to a temperature around 250° C. While the carbonation of the naphtholate does not proceed as rapidly as with a finely divided dry naphtholate without the presence of a material such as paraffin, it nevertheless proceeds with fair rapidity. The carbonation and conversion are completed by raising the temperature to about 250° C. The hydroxynaphthoic acid is thus produced in admixture with the paraffin.

In order to separate the hydroxynaphthoic acid from the paraffin, the mass may be allowed to cool only to a sufficient temperature to remove it from the autoclave, and then treated with hot water which dissolves the sodium salt of the hydroxynaphthoic acid while the paraffin floats on top of the solution. The paraffin can be removed by running it off while hot, or the solution and paraffin may be allowed to cool and the paraffin removed in a solid state. The paraffin so removed and recovered can be used over again with only such loss as is incident to handling it during the process.

It will thus be seen that the drying of the naphtholate and the conversion of naphtholate into the hydroxynaphthoic acid are effected in the presence of the indifferent solvent or diluent, such as paraffin, and that the conversion of the naphtholate by treatment with carbon dioxide, contrary to what might be expected, readily takes place even though the naphtholate is suspended in and protected by the indifferent diluent. The process is well adapted for use for the production of the hydroxynaphthoic acid as well as for the production of the sodium beta-naphtholate, where that product is desired as the product of the process.

The invention is applicable to the production of alkali salts of phenols other than sodium beta-naphtholate, as well as to the manufacture of carboxylic acids therefrom.

I claim:

1. The method of making dry sodium beta-naphtholate which comprises heating a solution of the naphtholate in the presence of an indifferent diluent.

2. The method of making dry sodium beta-naphtholate which comprises heating a solution of the naphtholate in the presence of paraffin in a liquid state.

3. The method of making 2.3-hydroxynaphthoic acid which comprises subjecting dry sodium naphtholate, in the presence of an indifferent diluent substantially non-volatile at the temperature of reaction, to the action of carbon dioxide under pressure and at a temperature of about 200 to 250° C.

4. The method of making 2.3-hydroxynaphthoic acid which comprises subjecting dry sodium naphtholate, in the presence of molten paraffin substantially non-volatile at the temperature of reaction, to the action of carbon dioxide under pressure and at a temperature of about 200 to 250° C.

5. The method of producing 2.3-hydroxynaphthoic acid which comprises heating a solution of sodium beta-naphtholate in the presence of an indifferent diluent to remove the water and give a finely divided dry naphtholate in suspension in such diluent, and subjecting the dry sodium naphtholate while still in admixture with such diluent to the action of carbon dioxide under pressure and at an elevated temperature.

6. The method of producing 2.3-hydroxynaphthoic acid which comprises heating a solution of sodium beta-naphtholate in the presence of molten paraffin to remove the water and give a finely divided dry naphtholate in suspension in such material, and subjecting the dry sodium naphtholate while still in admixture with such material to the action of carbon dioxide under pressure and at an elevated temperature.

7. The process of producing 2.3-hydroxynaphthoic acid which comprises drying sodium beta-naphtholate in admixture with an indifferent non-aqueous liquid vehicle and effecting the carbonation and conversion of the naphtholate in the presence of such vehicle.

8. The method of producing 2.3-hydroxynaphthoic acid which comprises drying sodium beta-naphtholate in admixture with a liquid vehicle which will not give an appreciable vapor pressure at the temperatures employed and will not react with the naphtholate nor with the hydroxynaphthoic acid, and effecting the carbonation and conversion of the naphtholate in the presence of such vehicle.

9. The method of producing 2.3-hydroxynaphthoic acid which comprises forming a mixture of melted paraffin and a water solution of sodium beta-naphtholate and heating the solution under reduced pressure to dry the naphtholate, and subjecting the naphtholate while still in admixture with the paraffin to the action of carbon dioxide gas under pressure and heating to effect the carbonation and conversion of the naphtholate and finally dissolving out the product and separating the paraffin from the solution.

10. The method of making dry alkali salts of phenols which comprises heating a solution of the phenolate in the presence of an indifferent diluent.

11. The method of making carboxylic derivatives of phenols which comprises subjecting non-volatile dry alkali metal phenolates, in the presence of an indifferent diluent substantially non-volatile at the temperature of reaction, to the action of carbon dioxide under pressure and at an elevated temperature.

12. Sodium beta-naphtholate in the form of a finely divided dry powder in admixture in suspension in a solidified indifferent vehicle.

13. The method of making dry sodium beta-naphtholate in admixture with paraffin, which comprises evaporating to dryness under reduced pressure a solution of the naphtholate in the presence of melted paraffin.

14. The method of making dry and finely divided sodium beta-naphtholate commixed with a solid indifferent vehicle, which comprises evaporating to dryness an aqueous solution of sodium beta-naphtholate in the presence of an indifferent and melted diluent which is solid at ordinary temperature, and subsequently cooling the mixture while it is being agitated.

15. The method of making finely divided and dry sodium beta-naphtholate admixed with and distributed through solid paraffin, which comprises evaporating to dryness under reduced pressure at a temperature of about 200° C. an aqueous solution of sodium beta-naphtholate in the presence of paraffin having a melting point of 124°–126° F., and subsequently cooling the mixture while it is being agitated.

16. In the process of making dry sodium beta-naphtholate by heating a solution of sodium beta-naphtholate, the improvement which comprises carrying out the operation in the presence of an indifferent organic diluent.

17. In the process of making 2.3-hydroxy-naphthoic acid by the action of carbon dioxide on sodium beta-naphtholate, the step of causing the action to occur in the presence of an indifferent organic diluent.

18. The method of making dry sodium beta-naphtholate, which comprises heating a mixture of sodium hydroxide and beta-naphthol in substantially equal molecular proportions in the presence of an indifferent diluent.

19. The method of making dry alkali metal phenolates, which comprises heating a mixture of caustic alkali and the phenol in substantially equal molecular proportions in the presence of an indifferent diluent.

20. The method of making dry alkali metal phenolates, which comprises heating a solution of the phenolates in the presence of an indifferent diluent.

21. The method of making dry alkali metal phenolates, which comprises heating a solution of the phenolates in the presence of paraffin in a liquid state.

In testimony whereof I affix my signature.

LEE H. CONE.